No. 867,331. PATENTED OCT. 1, 1907.
D. S. AFFLECK.
AUTOMATIC SAFETY CONTROLLING MEANS FOR TRAINS.
APPLICATION FILED AUG. 16, 1906.
11 SHEETS—SHEET 2.
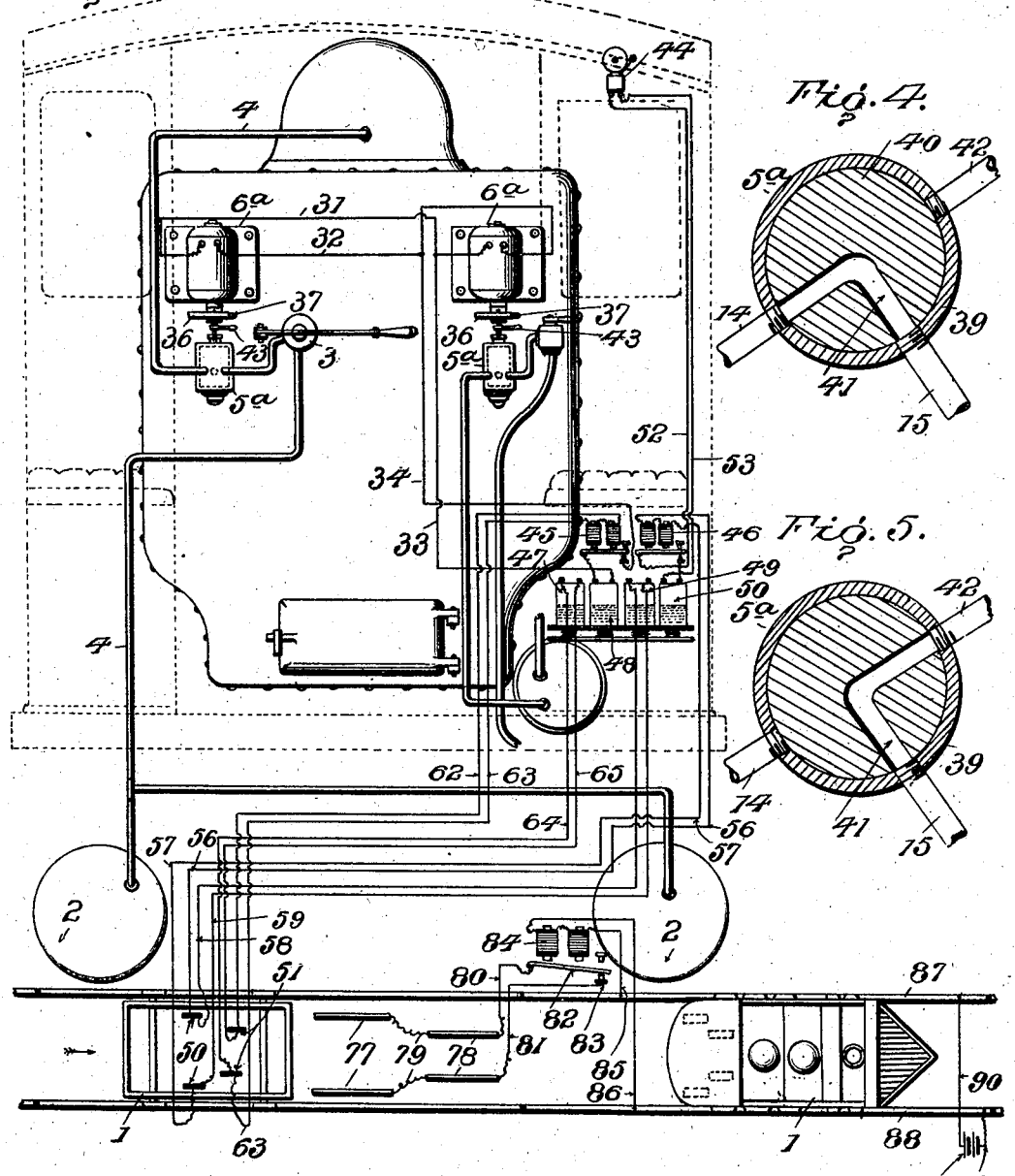
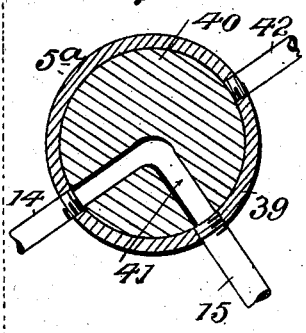
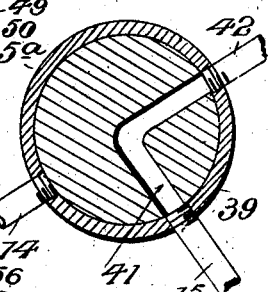
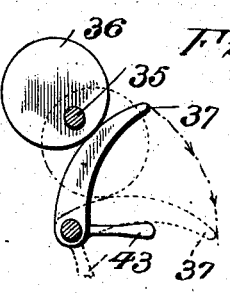

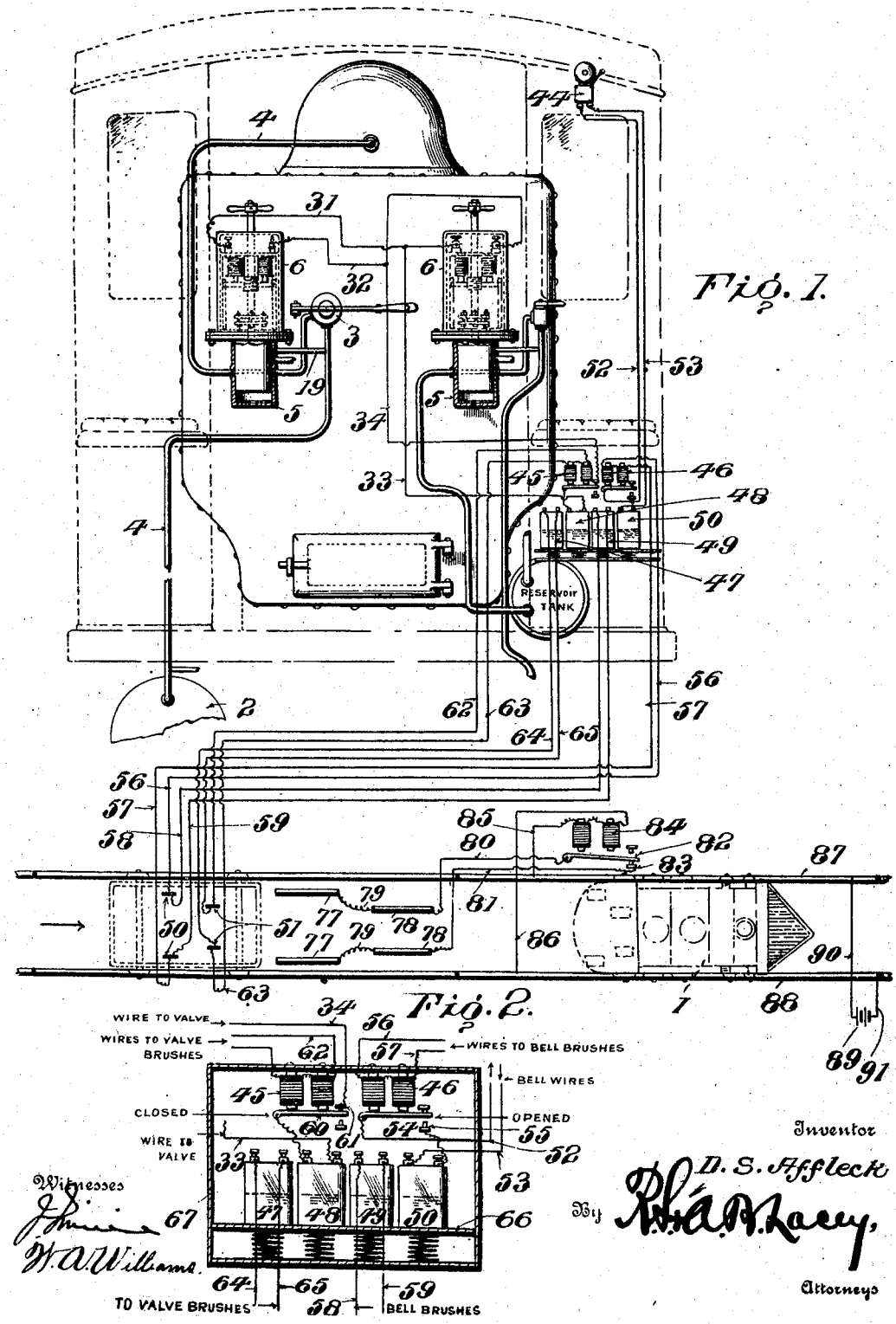

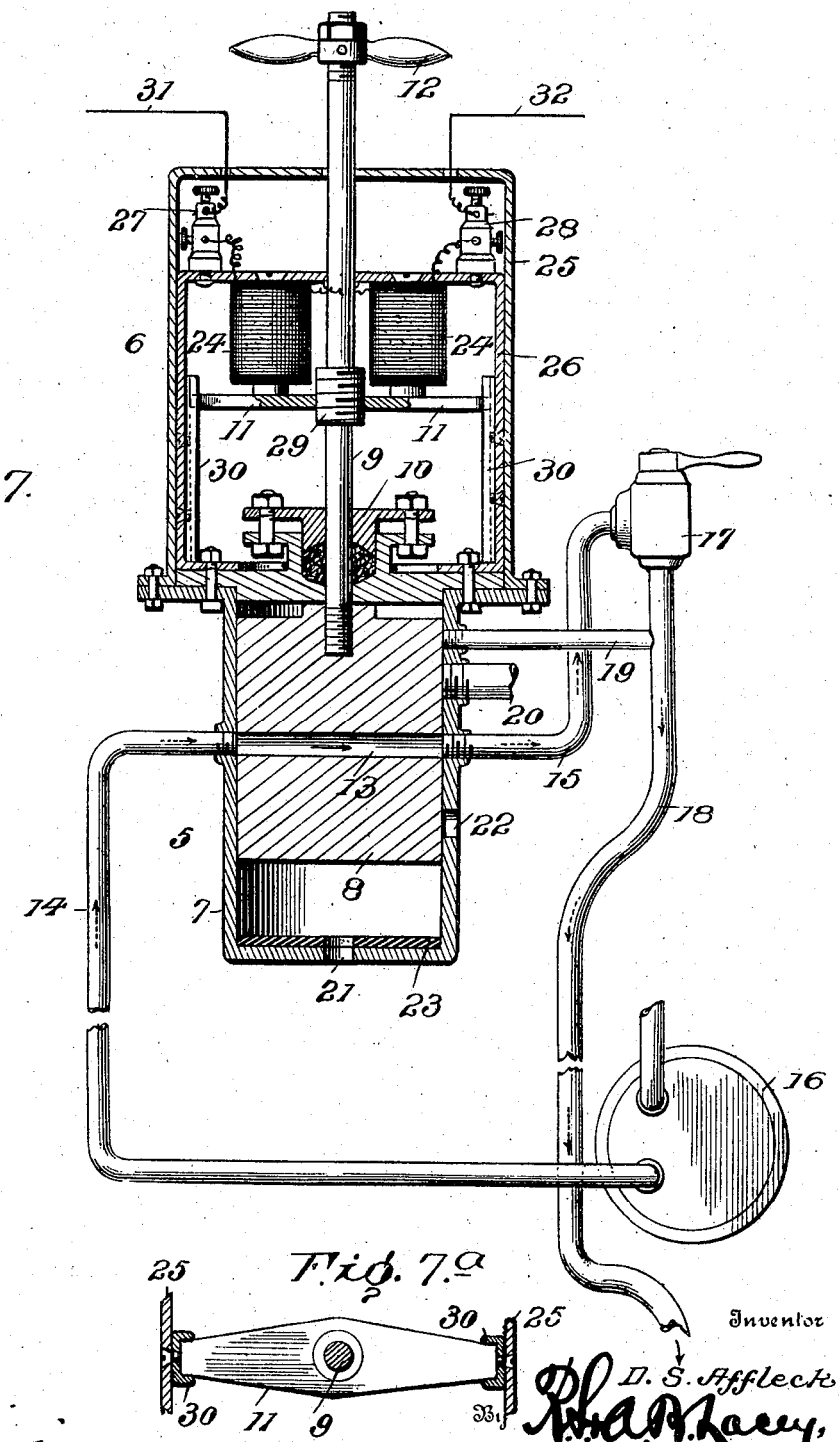

No. 867,331. PATENTED OCT. 1, 1907.
D. S. AFFLECK.
AUTOMATIC SAFETY CONTROLLING MEANS FOR TRAINS.
APPLICATION FILED AUG. 16, 1906.
11 SHEETS—SHEET 4.
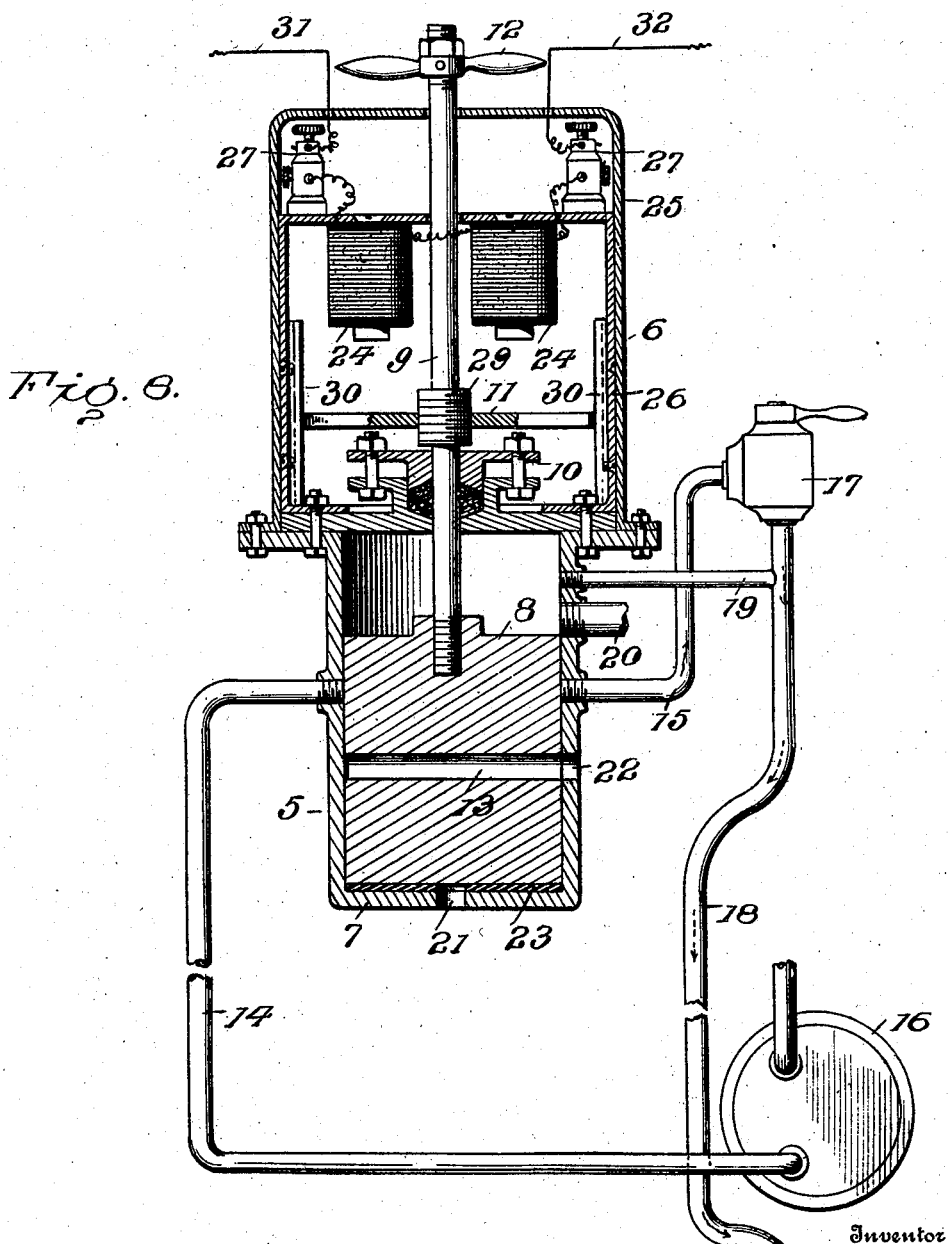

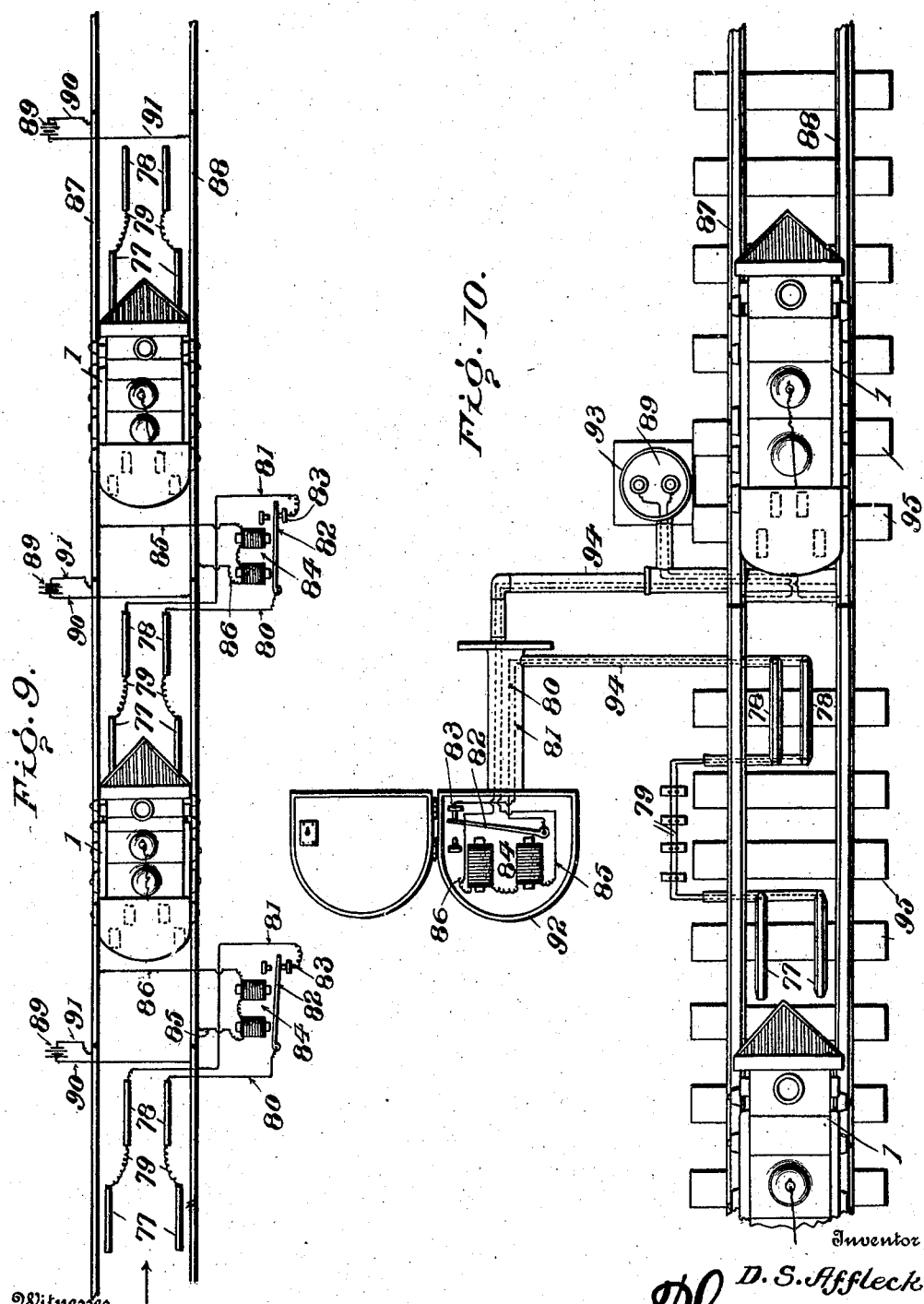

No. 867,331. PATENTED OCT. 1, 1907.
D. S. AFFLECK.
AUTOMATIC SAFETY CONTROLLING MEANS FOR TRAINS.
APPLICATION FILED AUG. 16, 1906.
11 SHEETS—SHEET 6.
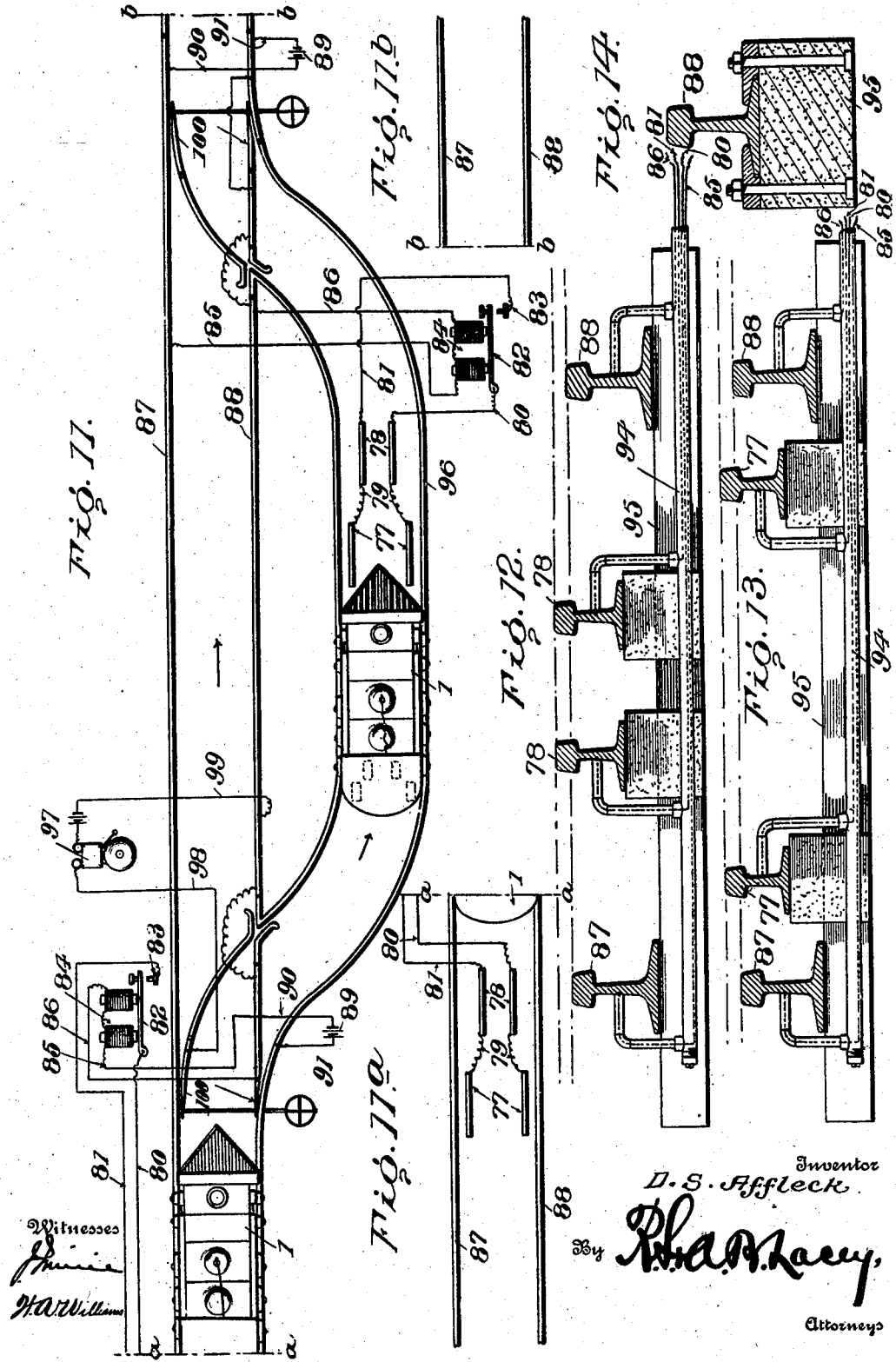
Inventor
D. S. Affleck
Witnesses

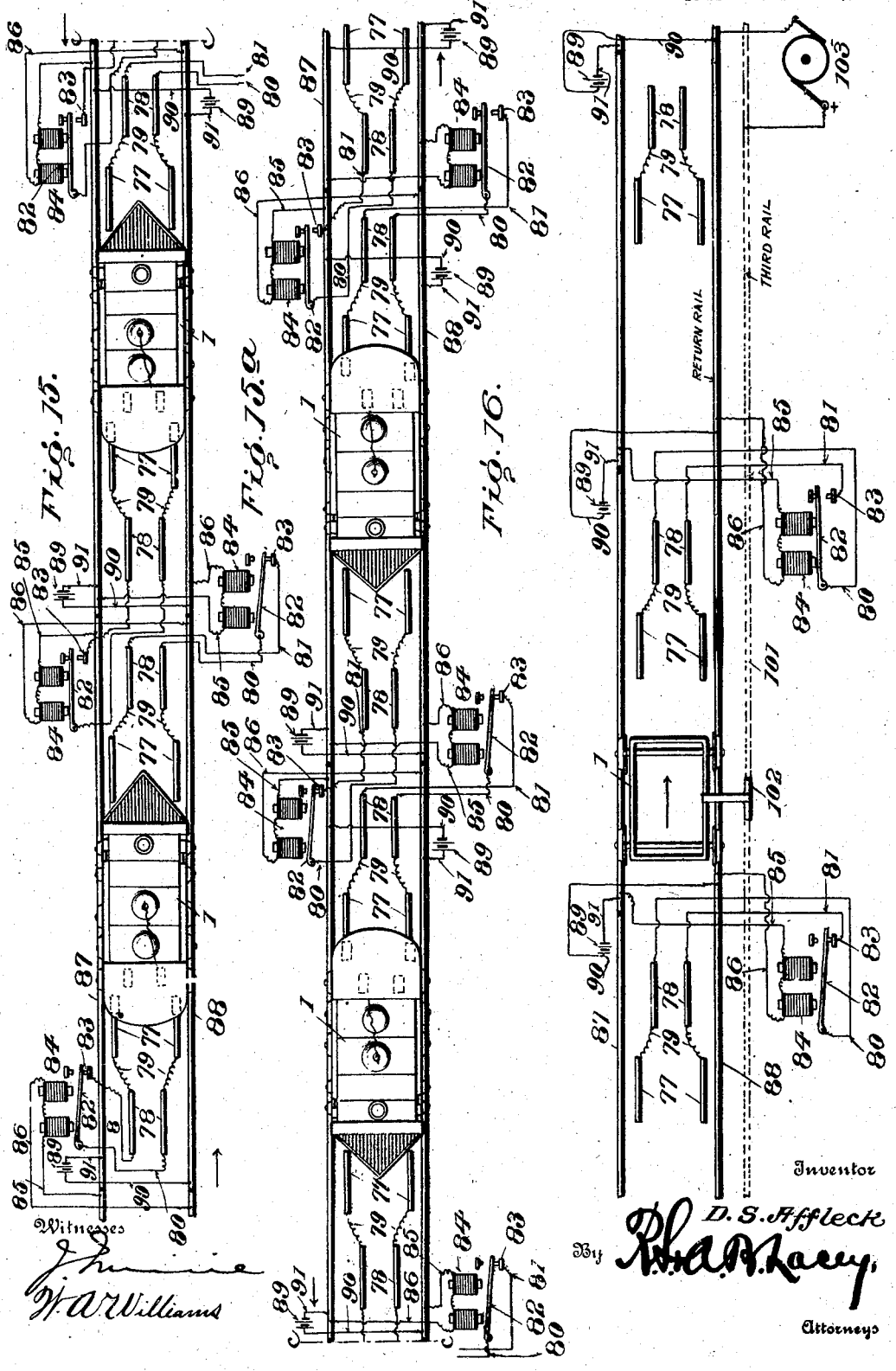

No. 867,331. PATENTED OCT. 1, 1907.
D. S. AFFLECK.
AUTOMATIC SAFETY CONTROLLING MEANS FOR TRAINS.
APPLICATION FILED AUG. 16, 1906.
11 SHEETS—SHEET 8.
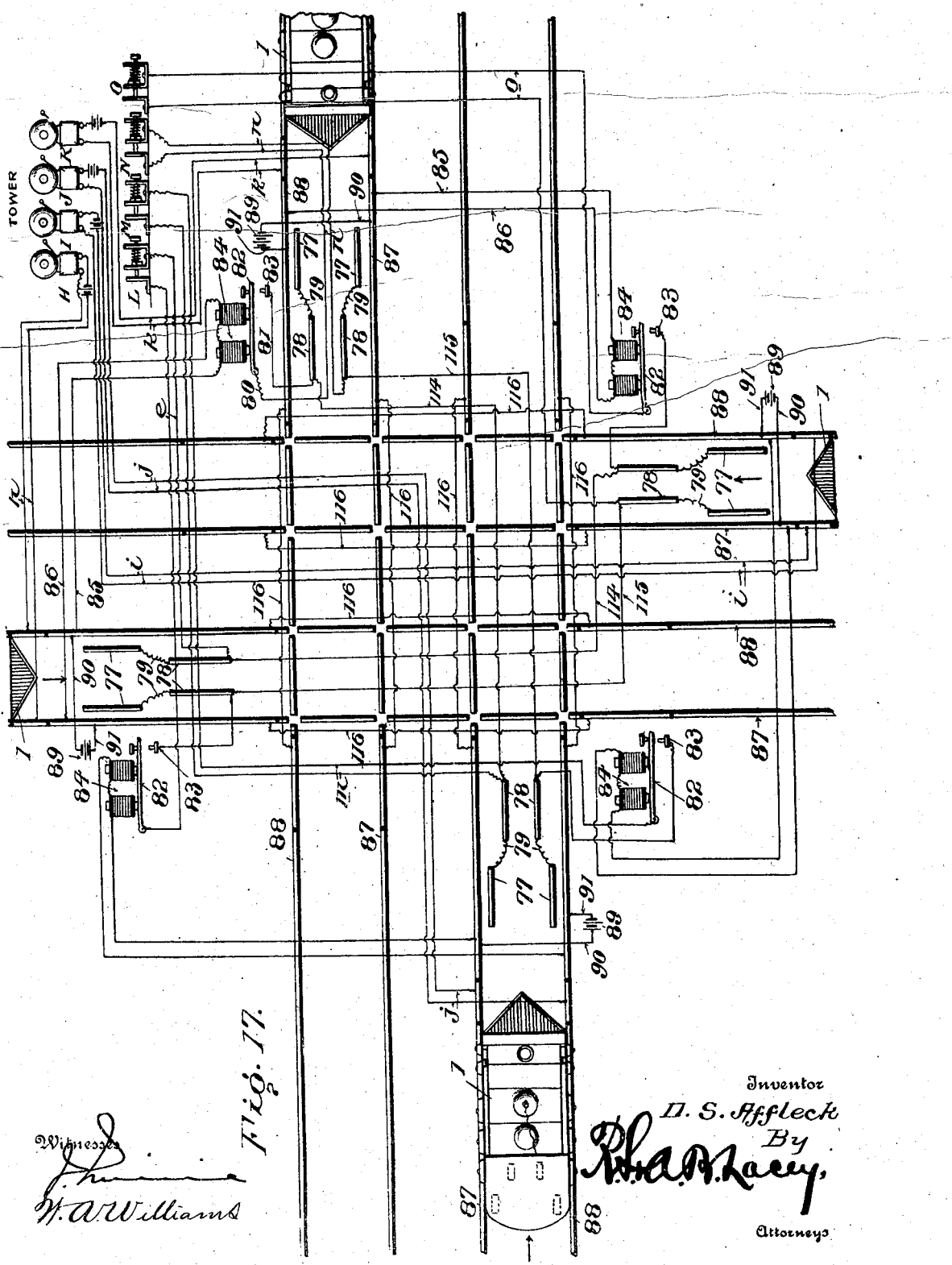

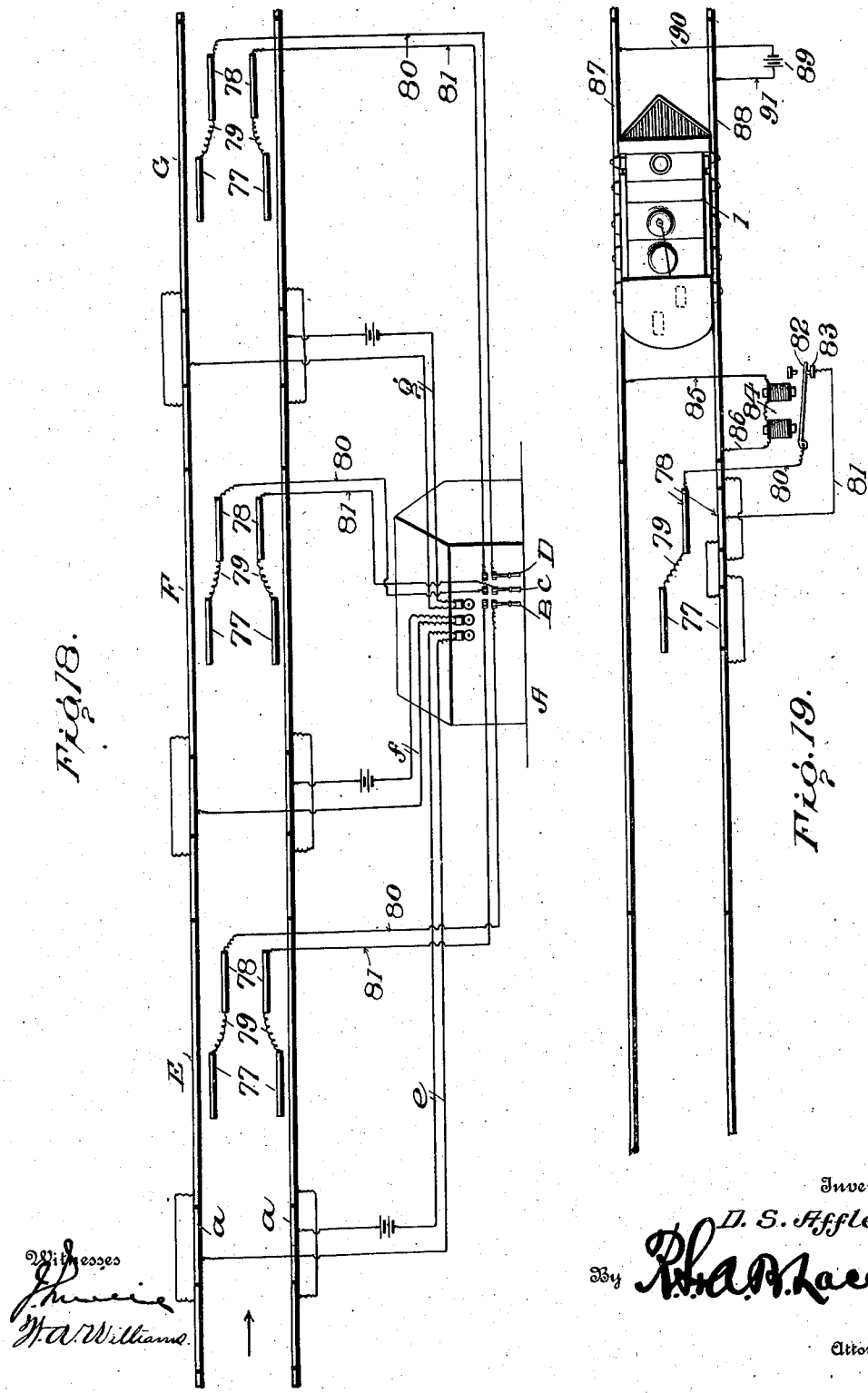

No. 867,331. PATENTED OCT. 1, 1907.
D. S. AFFLECK.
AUTOMATIC SAFETY CONTROLLING MEANS FOR TRAINS.
APPLICATION FILED AUG. 16, 1906.
11 SHEETS—SHEET 10.
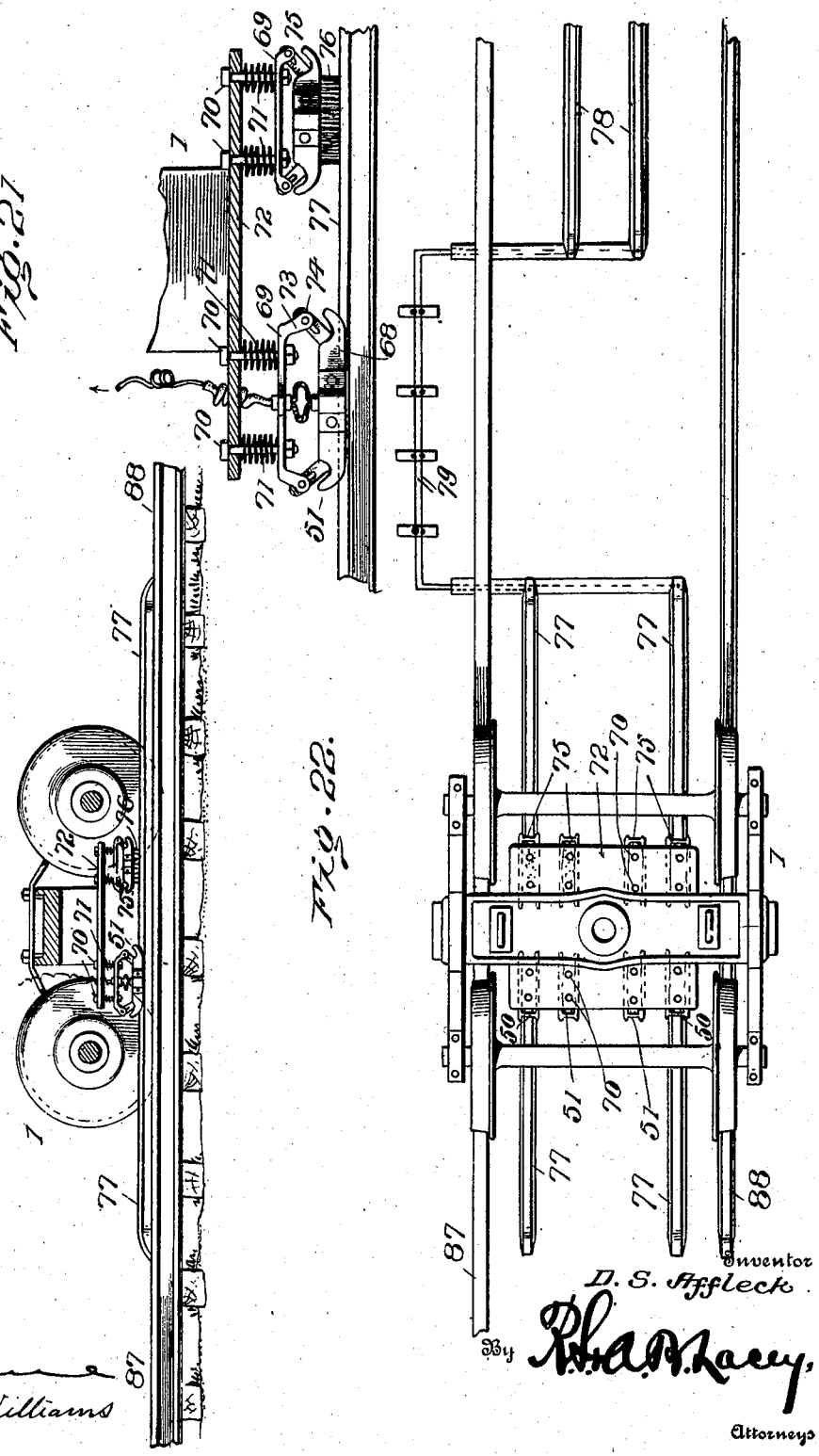

No. 867,331. PATENTED OCT. 1, 1907.
D. S. AFFLECK.
AUTOMATIC SAFETY CONTROLLING MEANS FOR TRAINS.
APPLICATION FILED AUG. 16, 1906.
11 SHEETS—SHEET 11.
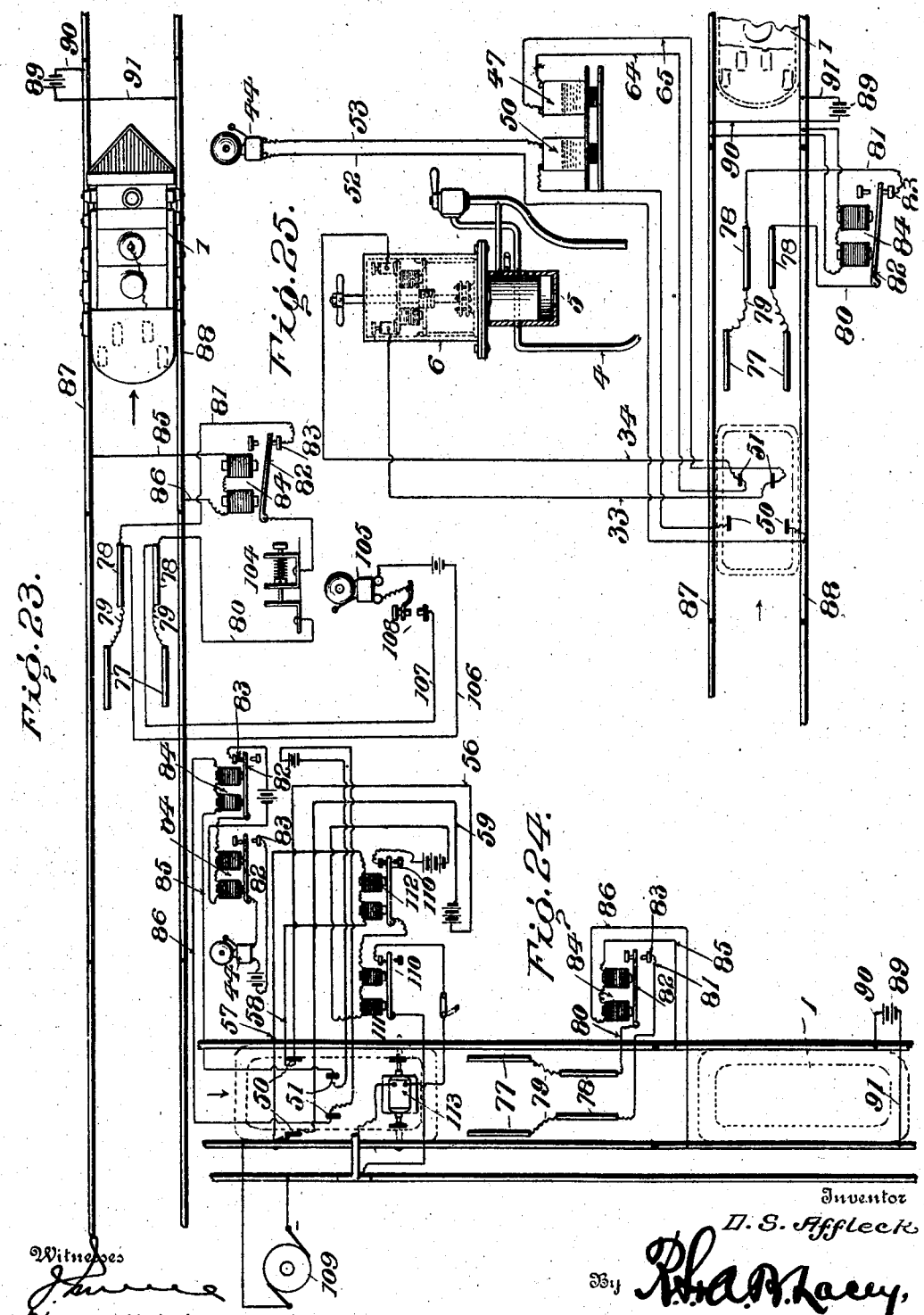

UNITED STATES PATENT OFFICE.

DAVID S. AFFLECK, OF CHICAGO, ILLINOIS.

AUTOMATIC SAFETY CONTROLLING MEANS FOR TRAINS.

No. 867,331.      Specification of Letters Patent.      Patented Oct. 1, 1907.

Application filed August 16, 1906. Serial No. 330,908.

To all whom it may concern:

Be it known that I, DAVID S. AFFLECK, a citizen of the United States, residing at Chicago, in the county of Cook and State of Illinois, have invented certain new and useful Improvements in Automatic Safety Controlling Means for Trains, of which the following is a specification.

The present invention appertains to block system for railways, whether operated by steam, electric or other power, and has for its object to provide novel safety appliances.

This invention relates to safety appliances to prevent "head-on" or "rear-end" collisions of trains in the event of misplaced switches, washouts or other disarrangements of the track tending to cause collision.

The invention aims to apprise the engineer, or other operator of a train, of impending danger and to shut off the motive power and apply the brakes automatically in the event of the signal going unheeded.

The invention also contemplates controlling the movements of trains by the station agent, whereby they may be stopped when moving in either direction.

The invention embodies an electric equipment consisting of circuits, circuit closers and instruments. The locomotive, car or other convenient element of the train is provided with instruments which serve to automatically give warning of imminent danger and adapted to set the brakes and to cut off the power. The circuits embodying the instruments are adapted to be closed by brushes, or similar contact pieces carried by the train, or like moving part, and safety rails conveniently arranged along the track and forming terminals of track circuits which when closed effect operation of the signal and the safety appliances. The train circuit is normally closed when running and is either neutralized or interrupted under abnormal condition to insure operation of the signal, brake and other safety devices with which the train may be equipped.

For a full description of the invention and the merits thereof and also to acquire a knowledge of the details of construction of the means for effecting the result, reference is to be had to the following description and accompanying drawings, in which:

Figure 1 is a diagrammatical view showing the invention applied to a locomotive and to the track. Fig. 2 is a detail view of the batteries, relays and box or case therefor provided upon the locomotive, car or other portion of the train or carrier. Fig. 3 is a view similar to Fig. 1, showing a modified form of valve and actuating means therefor, both for applying the brakes and shutting off the motive power. Fig. 4 is a transverse section of the valve on a larger scale, showing the train pipe in communication with the compressed air reservoir. Fig. 5 is a view similar to Fig. 4, showing the valve turned so as to establish communication between the train pipe and the outlet, whereby the brakes are permitted to operate. Fig. 6 is a detail view of the means for actuating the valve. Fig. 7 is an enlarged sectional view of the valve employed for establishing or cutting off communication between the brake cylinder and the compressed air reservoir, together with the coöperating actuating means. Fig. 7ᵃ is a detail view of the cross bar attached to the valve stem and the guides coöperating therewith. Fig. 8 is a view of the parts illustrated in Fig. 7, showing the valve moved so as to cut off communication between the train pipe and the reservoir and establishing communication between the train pipe and the outlet. Fig. 9 is a detail view showing an arrangement of track or block circuits to prevent rear-end collision. Fig. 10 is a view of a somewhat similar arrangement to Fig. 9 showing different mountings for the signal and safety rails, the relay, battery and wire connections. Fig. 11 is a detail view showing the application of the invention to a siding. Figs. 11ᵃ and 11ᵇ are extensions of the main track illustrated in Fig. 11. Figs. 12 and 13 are detail view of the main, safety and signal rails, showing their mounting and the manner of connecting the electric wires thereto. Fig. 14 is a transverse section on an enlarged scale of a rail and the support and securing means therefor. Fig. 15 is a detail view showing an arrangement of track or block circuits for preventing both rear-end and head-on collisions. Fig. 15ᵃ is an extension of the block system shown in Fig. 15. Fig. 16 is a detail view showing a block system embodying the invention in which a third rail is employed for transmitting electric current to the car, train or like carrier to be operated. Fig. 17 is a detail view showing the invention applied to a four-way crossing and having connection therewith, signaling and switch mechanisms for informing the operator in the tower when a car or train reaches the danger zone so that the safety appliances may be operated by hand should occasion require. Fig. 18 is a detail view admitting of the safety and signal rails being short-circuited from a station so that a train or car may be brought to a stand still before reaching the station or when opposite the same. Fig. 19 is a detail view showing an arrangement whereby the track circuit may embody but one safety and one signal rail for a block. Fig. 20 is a longitudinal section of a truck showing the contact and cleaning brushes coöperating therewith. Fig. 21 is an enlarged view of the contact and cleaning brushes, showing the mountings therefor and a coöperating rail. Fig. 22 is a top plan view of the truck and a portion of a track, showing the signal and safety rails and electric connections between them. Fig. 23 is a detail view of an arrangement of circuits, whereby the engineer may ascertain the cause of short-circuiting the signal and safety rails and of determining whether the block ahead is clear. Fig. 24 is a detail view showing an adaptation of the invention to a system in which the train or carrier is operated by electric power and admitting of said power being cut off automatically should the signal go unheeded. Fig. 25 is a detail view showing the invention in a simplified form, the relays being dispensed with and the signal and safety circuits being directly controlled from the signal and safety rails.

Corresponding and like parts are referred to in the following description and indicated in all the views of the drawings by the same reference characters.

The invention is applicable to cars or like carriers propelled either by steam, electricity or other motive medium, the elements of the safety appliances being disposed with reference to the brakes, motive power and signaling means to effect automatic actuation thereof.

The car, train, carrier or like moving part 1 is equipped with signal and safety appliances, the latter being normally held in running position, preferably by means of a magnet included in a circuit which may either be interrupted or closed under abnormal conditions, as in the event of impending danger, to effect automatic operation of the safety devices. The track is subdivided into sections or blocks, each of which is provided with an electric circuit normally open and a second or controlling circuit to effect closing of the main track circuit, whereby any train reaching a danger zone is apprised of the impending danger and a moment thereafter automatically brought to a stand-still, in the event of the warning going unheeded, by automatic application of the brakes and cutting off of the motive power whether the same be steam, compressed air, electricity or other type of motive power.

The instruments forming a part of the signal and safety devices may be conveniently located upon any part of the train, car or like carrier. In the arrangement disclosed in Figs. 1 and 3, the car or like moving part is designed to be propelled by steam, the operating engine being shown at 2, the throttle valve at 3 and controlling means interposed in the length of the steam pipe 4 which connects the steam dome with the engine, said controlling means comprising a valve 5 or 5ª and an electric actuator 6 or 6ª.

The valve 5 consists of a cylinder 7 and a piston 8, the latter mounted to reciprocate in the cylinder, but held from turning therein so as to insure registry of the ports. The piston rod 9 operates in a stuffing box 10 at the upper end of the cylinder 7 and carries an armature 11 and is provided at its upper or exposed end with a handle 12 to be grasped by the engineer or operator when it is required to set the valve after being operated. A port 13 is formed transversely of the piston 8 and is adapted to register with corresponding ports in opposite sides of the cylinder with which pipes 14 and 15 communicate. The pipe 14 connects with the main reservoir 16, whereas the pipe 15 connects with the engineer's valve 17, the latter having connection with the train pipe 18 in the accustomed manner and for the purpose well known in pneumatic brake apparatus. A relief pipe 19 connects the train pipe 18 with an end portion of the cylinder 7, the latter in turn having a port or vent 20 to provide an escape for the air from the train pipe when the valve 5 is operated in an emergency. A vent 21 is provided in the bottom of the cylinder 7 to admit of ingress and egress of air incident to the operation of the piston 8 in the cylinder. An opening 22 in a side of the cylinder 7 is adapted to register with the port 13 of the piston 8 when the latter is moved downward in the cylinder to cut off communication between the main reservoir and the engineer's valve, as shown most clearly in Fig. 8. The air confined in port 13 finds a ready escape through the opening 22 when the piston 8 assumes the position indicated in Fig. 8. A buffer 23 is located in the bottom of the cylinder 7 to receive the impact of the piston 8 when driven rapidly by the back-flow of air from the train pipe after the inner end of the relief pipe 19 has been uncovered in the initial movement of the piston when released from the controlling influence of the electric actuator 6.

The electric actuator 6 is suitably incased or housed and comprises an electro-magnet 24 and armature, the latter consisting of the cross bar 11. The inclosing case 25 is preferably of metal and the supporting frame 26 located therein is preferably of some suitable dielectric material. The terminal wires of the electro-magnet 24 are connected with binding posts 27 and 28. The cross bar or armature 11 has screw thread connection 29 with the valve stem 9, thereby admitting of relative adjustment of the armature, piston 8 and electro-magnet. Suitable guides 30 at opposite sides of the case 25 receive the ends of the cross bar or armature 11 and direct the same in its vertical movements. Lead wires 31 and 32 connect the respective binding posts 27 and 28 with wires 33 and 34 comprising an electric circuit including the electric actuator for controlling the valve, whereby the brakes are applied and motive power cut off in an emergency. The electric actuators and controlling valves illustrated in Fig. 1 and in detail in Figs. 7 and 8 are substantially identical in structure for both the brake mechanism and the power controlling mechanism, hence a detail description and illustration suffices for a clear understanding thereof. In the valve interposed in the length of the pipe 4 the throttle valve 3, if not closed in an emergency, nevertheless, is controlled by the valve 5, which when released from the controlling influence of the electric actuator, cuts off the supply of steam or other motive fluid to the engine. Any back pressure to the engine finds relief through the pipe 19 and the vent 20, as will be readily understood.

The electric actuator 6 and the valve 5 are of the reciprocating type, but said parts may be of the rotary type, as shown in Fig. 3 and in the detail views Figs. 4, 5 and 6. The electric actuator 6ª is a rotary motor of any design and type and the shaft 35 of its armature is provided with a cam 36 which is arranged to engage with the handle 37 made fast to the stem 38 of the valve 5ª so as to move said valve into the position shown in Fig. 5 when the safety appliances are automatically brought into play both to apply the brakes and to cut off the supply of steam or motive fluid to the engine. The valve 5ª comprises a casing 39 and a plug 40, the latter having an angle opening or port 41 which is adapted to register with ports in communication with the pipes 14 and 15 or with ports in communication with the train pipe 15 and a relief 42. Under normal conditions the plug 40 occupies a position shown in Fig. 4, whereby the steam or motive fluid is adapted to be controlled by the throttle valve 3. When the valve 5ª has been automatically operated to shut off the supply of motive fluid to the engine, the valve 5ª assumes the position shown in Fig. 5, thereby preventing the steam or other motive fluid from reaching the engine even though the throttle valve 3 may be open. The electric actuator 6 is included in a closed circuit, which when broken permits the piston 8 to drop and simultaneously apply the brakes and cut off the motive power to the engine. The electric actuator 6ª is included in an open circuit, which is adapted to be closed in an emergency, thereby permitting the motor to operate to rotate the shaft 35 and cam 36 so as to turn the plug 40 and both apply the brakes and cut off the motive power. The plug 40 is provided with a handle 43 which provides convenient means for resetting or returning the valve 5ª to normal condition.

The car, engine, train or like carrier is provided with a signal 44 preferably in the form of an electric bell, together with relays 45 and 46, batteries 47, 48, 49 and 50 and circuits for the two electric actuators, the signal, the relays and batteries and the brushes or contact pieces 50 and 51. The brushes or contact pieces 50 control the signal circuit, whereas the brushes or contact pieces 51 control the circuits of the safety appliances, whereby the brakes are set and the motive power cut off. The signal circuit comprises the wires 52 and 53 and the battery 50, said circuit being normally open and controlled by means of the relay 46, which is included in a closed circuit and which latter circuit, when equalized or otherwise affected, permits the signal circuit to become closed and apprise the engineer or other person of impending danger so that the car, train or other carrier may be brought to a stand-still or caused to move forward with great caution. The armature 54 of the relay 46 is included in the signal circuit, and when attracted by the electro-magnet of the relay 46 is held away from the contact 55, thereby holding the signal circuit open, but in the event of the circuit including the relay 46 being short circuited or otherwise affected, the armature 54 moves away from the relay and coming in contact with the part 55 closes the signal circuit and gives the alarm. Wires 56 and 57 connect the relay 46 with the signal brushes or contact pieces 50 and other wires 58 and 59 connect said signal brushes or contact pieces with the poles of the battery 49. In an emergency the brushes or contact pieces 50 are short-circuited, thereby practically throwing the battery 49 out of action and the relay 46 becoming demagnetized permits the armature 54 to move and close the signal circuit at 55.

The electric actuator 6 or 6ª is included in an electric circuit represented by the wires 33 and 34, or 33, 34, 31 and 32 and includes the battery 48 and a circuit closer consisting of armature 60 and 61, said circuit being either open or closed according to the type of actuator 6 or 6ª employed. As shown in Fig. 1, the circuit 33 and 34 is closed, whereas in the arrangement illustrated in Fig. 3 the circuit 33 and 34 is open and is adapted to be closed when the brakes are applied and the motive power cut off. The safety brushes or contact pieces 51 are included in a local circuit with the relay 45, whose armature 60 controls the circuit of the electric actuators. Lead wires 62 and 63 connect the terminals of the electro-magnet of relay 45 with the safety brushes or contact pieces 51 and other wires 64 and 65 connect said safety brushes 51 with the poles of the battery 47. The relay 45 is normally included in a closed circuit, which when short-circuited to cut the battery 47 out of action, permits the armatures 60 to move either towards or away from the contact 61 so as either to close or open the circuit controlling the electric actuator according to the type thereof.

The relays 45 and 46 and the several batteries 47, 48, 49 and 50 may be conveniently located upon the engine, car or other carrier so as to be out of the way, yet readily accessible for any purpose. As shown most clearly in Fig. 2, the batteries are placed upon a support 66 which in turn rests upon one or more springs 67 so as to neutralize shock, vibration and the like when the car, train or carrier receives a sudden movement. The relays and batteries are preferably inclosed in a case or box 67 which may be placed under a seat of the carrier or in any other out of the way convenient place.

The brushes or contact pieces 50 and 51 are of like formation and may be alined transversely of the truck as indicated in Fig. 22 or may be out of line, as shown in Figs. 1 and 3. For convenience, the signal brushes or contact pieces 50 are arranged exterior to the brushes or contact pieces 51 and the signal and safety rails are correspondingly placed, thereby preventing either set of brushes 50 or 51 making contact with both sets of contact rails and insuring engagement of the signal brushes with the signal rails, only, and the safety brushes with the safety rails, only. As indicated in Figs. 20 and 21, the contact brushes each embody a shoe 68, a head 69, guides 70 and springs 71. The guides 70 preferably consist of bolts or pins let into a plate or other support 72 of truck or other part of the car. The head 69 is mounted to move vertically upon the guide 70 and is pressed downward by means of the springs 71, which latter admit of the shoe having a limited yielding play so as to keep the shoe in contact with the rail while at the same time permitting the truck to have a vertical vibratory movement. Pending arms 73 of the head 69 have connection with upwardly extended arms 74 of the shoe, a pin and slot connection being formed between the arms 73 and 74 to admit of the shoe having a limited angular movement, whereby the entire length of the shoe may be in contact with the rail at all times when passing thereover, the shoe moving to accommodate itself to the relative inclination of the contact rail should the same incline up or down.

The lead wire passes through the head 69 and is electrically connected with the shoe 68 in any manner, and a fullness or ample amount of slack of wire is provided between the head 69 and shoe to admit of relative play without injuring the wire. An ample amount of wire is provided in the head 69 and support 72 as well as between the latter and the body of the car or carrier for a like purpose. A cleaner brush 75 is provided for each contact brush and is arranged in the front thereof so as to clear the respective contact rails in advance of the contact brushes. The cleaner brushes are constructed substantially the same as the contact brushes, as indicated most clearly in Fig. 21, the only difference being that the shoe 68 is provided with brush material 76 preferably consisting of fine steel wires. The line of railway to be equipped with the invention is subdivided into blocks or sections which are electrically insulated one from the other, each block or section being provided with signal rails 77, safety rails 78 and an electric circuit for short-circuiting the signal and safety rails, whereby the signal and safety appliances of a car, train or the like are automatically brought into play in the event of such car entering a block or section of railway whose signal and safety rails are short-circuited by a car, train or the like occupying a block ahead or from other cause. It is to be understood that the signal rails 77 are located a mile more or less from the safety rails, but are connected thereto by means of wires 79. Other wires 80 and 81 connect the contact rails upon opposite sides of the track with a circuit closer 82 and 83, conveniently positioned at one side of the track. The part 82 is movable and is the armature of a relay or electro-magnet 84, whose terminals are connected by wires 85—86 with the respective track rails 87 and 88 of a block or section and which rails are included in an electric circuit provided with a battery 89 having its poles connected by wires 90 and 91 with the respective rails 87 and 88. The track circuit including the relay or electro-magnet 84 is normally closed, thereby holding the circuit closer 82—83 open, but when a block or section is occupied by a car, train, or like carrier, as shown in Figs. 1 and 2, the battery 89 is short-circuited, thereby permitting demagnetization of the relay or electro-magnet 84 and the relaxing of the armature 82 which moves away therefrom and closes the circuit including the signal and safety rails by contact of the part 82 with the part 83. A train, car or like part following a train or carrier which is only ahead by the distance represented by adjacent blocks or sections, is advised of the occupancy of the block or section of track immediately ahead when the signal brushes 50 come in contact with a signal rail 77, and should the engineer or operator fail to heed the warning and continue ahead and reach the safety rails before the train or car ahead clears the block or section, the safety appliances will be brought into operation automatically and set the brakes and cut off the motive power in the manner stated. However, should the train or car clear the block or section ahead, the train or car following upon reaching the safety rails will not have its safety appliances operated because the circuit including the safety rails will not be closed.

Fig. 18 illustrates an arrangement whereby the despatcher or station agent may control trains, cars or the like from either approach or when reaching a point opposite the station. The station A is provided with three switches B, C and D which are connected by wires 80 and 81 with the signal safety rails of the blocks or sections E, F and G. Upon operating any one of the three switches B, C and D, the signal and safety rails of any one of the three sections or blocks may be closed, thereby sending out a warning to the train and bringing the same to a stand-still. Each of the blocks E, F and G is provided with a signal circuit, whereby the despatcher or station agent may be informed when a train, car or the like has reached a position on the track within the scope of the three blocks or sections E, F and G. The respective signal circuits are indicated at $e, f$ and $g$, each including a battery, a suitable signal such as a bell and contact rails $a$ which are electrically insulated from the track rails of the respective block sections. When a train, car or the like enters the section of track including the contact rails $a$, the latter are bridged through the wheels and axle of a truck, thereby sounding the alarm or setting the signal so that the station agent or despatcher may, if desired, bring the train or car to a stand-still upon the required block or section $e, f$ or $g$. In the arrangement illustrated in Fig. 19, sections of one of the rails of the main track are utilized as contact rails for the signal and safety rails, hence the construction is simplified to the extent of necessitating the provision of one set of contact rails 77 and 78 only. The sections of the main rail corresponding to the signal and safety rails are electrically insulated from one another and from the rails of the block sections, the wiring and circuit closing means being substantially the same as shown in Figs. 1 and 3. Fig. 19 shows the track circuit closed and the signal and safety circuit open, but it is to be understood that when a block or section of railway is occupied, the signal and safety rails of the block or section immediately following are short-circuited by contact of the parts 82 and 83, hence the train or car following is advised of the occupancy of the block immediately ahead and brought to a stand-still, should it attempt to pass by the safety rails while the preceding block is still occupied.

Fig. 9 shows adjacent blocks or sections occupied by means of a car or like part. The foremost block or section of track has its battery 89 short-circuited, thereby permitting the relay or electro-magnet 84 thereto to lose its attractive force for the armature 82, whereby the signal and safety rails of the block or section of track immediately following are short-circuited with the result that the car, train or the like entering said block is first advised of the occupancy of the block ahead and should such warning go unheeded and the car proceed, it will automatically have the brake applied and its motive power cut off should the preceding block remain occupied, as will be readily understood from the aforesaid description.

Fig. 10 illustrates the relay or electro-magnet 84 and coöperating circuit closer inclosed in a box 92, and the battery 89 inclosed in a chute or housing 93, and the several wires incased or protected by tiling 94 or like conduit. The wiring 79 connecting the signal rails 77 and the safety rails 78 is arranged at one side of the track and mounted upon a stage or other suitable support so as to be protected and out of the way.

Figs. 12, 13 and 14 show the several track and contact rails mounted upon concrete ties or sleepers 95, the rails being secured to their supports by means of clips which are bolted thereto, as shown most clearly in Fig. 14.

Fig. 11 shows the invention applied to a siding, the latter being indicated at 96 and having a switch at each end for connecting it with the main track. Fig. 11$^a$ is a continuation of the left hand portion of Fig. 11, whereas Fig. 11$^b$ is a continuation of the right-hand portion of Fig. 11. The siding is provided with signal and safety rails which are adapted to be closed at 82 and 83 by means of the relay or electro-magnet 84 in the manner heretofore stated. When a train, car or like carrier occupies the main track between the points of connection of the siding 96 therewith, the battery 89 of the track circuit is short-circuited and the signal and safety rails of the siding closed, with the result that a car or train moving upon the siding receives a warning indicating that the block or section opposite thereto is occupied, and should the train proceed upon the siding until the safety rails is reached, it will be brought to a stand-still in the manner heretofore stated provided the main track opposite the siding is still occupied. Should the siding be open and occupied by a train or car, a following train or car is advised of the occupancy of the siding by having its signal sounded upon reaching the signal rails which have been closed by means of breaking the work of relay 24 by the switch. On the other hand, should the siding be closed with reference to the main track so that a car may pass from said main track onto the siding and while the latter is occupied, the following car will be advised of the prior occupation of the siding, thereby avoiding rear-end collision. Closing the left-hand switch to admit of a train passing from the main track to the siding results in breaking the circuit through the electro-magnet 84 whereby the circuit is closed at 82 and 83 through the signal rails of Fig. 11ᵃ, whereby a train approaching the siding will upon reaching the contact rails 77 and 78 of Fig. 11ᵃ, receive a warning in the manner described hereinbefore. By this means a train is prevented from running into an open switch or upon the siding when the latter is occupied. To further increase the safety at the juncture of the siding with the main track, a signal 97 is provided and included in a circuit comprising wires 98 and 99, the latter being connected to a rail 88 of the main track and the wire 98 being connected to a switch point 100. It will thus be understood that when a switch is closed and the switch points brought into contact with the rails 87 and 88 and the latter short circuited by the wheels and axle of a car or truck, the signal circuits 98 and 99 will be set and the signal sounded or set. In this connection it is also understood that should trains or cars approach the siding in opposite directions, the signal and safety rails of adjacent sections will be short-circuited, hence the engineers of the respective trains will be advised of impending danger so that the proper caution may be exercised and in the event of the signals going unheeded or fail to operate, the trains will be brought to a stand-still by automatic application of the brakes and cutting off of the motive power.

Fig. 17 illustrates the application of the invention to a four way crossing, whereby the train or car approaching the crossing will operate to short circuit the signal and safety rails of the tracks intersecting the track upon which said train or car is approaching the crossing. This figure also illustrates a signal and a switch for each of the four approaches of the crossing, whereby an operator in a tower or other convenient point may be advised as to the position of a train or car so that any one or more of the switches may be thrown by hand to send out a warning to any desired train or car on any of the other approaches and bring the same to a stand-still should proper attention not be given to the warning. The signals are indicated at H, I, J and K, one being provided for each approach of the crossing, the respective circuits being designated at $h, i, j$ and $k$. The switches to admit of closing the respective signal and safety rails of the different approaches are indicated at L, M, N and O and the respective circuits at $l, m, n$ and $o$. One wire of each of the four circuits $l, m, n$ and $o$ has connection with a signal and a safety rail of each approach to the crossing, whereas the other wire is connected with the armature 82 of the respective track circuits, thereby admitting of the signal and safety rails of any one of the four approaches being closed either automatically, by a train or car or by the operator through the intervention of any one of the switches L, M, N, and O. Each approach has a section of the track electrically insulated so as to form a block or section, the track rails 87 and 88 being connected by wires 85 and 86 with the electro-magnet or relay 84 and with wires 90 and 91 with the battery 89. When any one of the approaches adjacent to the crossing is occupied by a train or car, the signal and safety rails of the other two approaches intersecting with the approach thus occupied, are short-circuited, thereby admitting of a train or car approaching the crossing receiving a warning and ultimately being brought to a stand-still. As is the arrangement shown in Fig. 18 with reference to short sections of rails being interposed between the blocks to close the several signal circuits, so, also, a like arrangement of short rails is provided for the several signal circuits so that when a train or car enters any one of the signal sections of track, the corresponding signal is sounded or set, so as to apprise the operator in the tower or station of the position of the train or car. A set of rails is provided for each signal circuit and are electrically insulated from the adjacent track rail of which they form a part.

Figs. 15 and 15 indicate a system of wiring and location of relays to prevent rear-end and head-on collisions, the signal and safety rails being adapted to be short-circuited upon short-circuiting of the track circuits when a block or section is occupied by means of an engine, car or train. Inasmuch as the several circuits are substantially identical with the circuits hereinbefore described, it is not deemed necessary to refer to the same in detail, the reference characters identifying the parts and the operation being perfectly plain from the description herein. For convenience, the relays and batteries of the track circuits are illustrated upon opposite sides of the track, but it is obvious that said parts may be located upon one side or the other of the track, only.

Fig. 16 shows an arrangement of relays and track circuits applied to an electrically operated railway utilizing a third rail 101, the current being taken from said rail through a brush or contact 102 connected with the car 1. One of the main rails of the track is utilized as the return. The dynamo for generating the current is indicated at 103. The signal and safety rails are connected with the electric circuit closers 82—83 in the manner hereinbefore specified, and said circuit closers are controlled by the relays or electro-magnets 84 included in the track circuits, whose batteries are short-circuited when a block or section of the railway track is occupied. An engineer or operator of a train, car or the like, after receiving a signal, may desire to ascertain the cause, since it frequently happens that the circuits become disarranged from one cause or another. To attain this object, the arrangement illustrated in Fig. 23 has been devised. The signal and safety rails 77 and 78 are included in a circuit in substantially the same manner as heretofore described. The track circuit including the battery 89 and relay and electro-magnet 84, is substantially the same as heretofore described. A switch 104 is interposed in the circuit 80—81 including the signal and safety rails and is adapted to admit of said circuit being opened and closed at will when its controlling electric circuit in interrupted, as by short-circuiting due to the block or section being occupied. A bell or signal 105 is included in a signal circuit 106—107, which is also provided with a key or circuit closer 108. The signal circuit is looped into the circuit containing the signal and safety rails and when said rails are short-circuited, the closing of the key 108 sounds or sets the signal 105, hence should there be a number of circuits at any one point, the engineer or operator by trial can determine which of the circuits is closed and ascertain the cause and remedy the same if it results from disarrangement of instruments or wiring.
Fig. 24 shows a system somewhat similar to Figs. 1 and 3, whereby the electric current utilized as the propelling means is cut off in an emergency. The dynamo for supplying the current for propelling the car or train is indicated at 109 and the automatic switch for interrupting or breaking the circuit is shown at 110 and is controlled by means of an electro-magnet 111 included in a circuit containing the electric actuator 112, which is an electro-magnet included in the circuit containing the brushes or contact points 51. When the switch 110 is open, the electric motor 113 is cut out, hence the car or like part is brought to a standstill.

Fig. 25 shows an arrangement in which the relays 45 and 46 and their circuits and batteries are dispensed with, the electric actuator and the signal provided upon the car, train or the like being operated directly from the signal and safety rails in the event of the same being short-circuited by the occupancy of a block or section of track immediately in advance of that occupied by a moving train or car.

It will be observed on reference to Fig. 17 that the signal and safety rails of approaches in the same direction, are connected by wires 114 and 115 so as to increase the chances for operation or short-circuiting of the contact rails of the other two approaches should the electric connections become disarranged from any cause. Attention is also directed to the fact that the switches L, M, N and O are normally closed, hence short-circuiting of the contact rails of any approach is effected through the switch included in said circuit, thereby enabling the operator in the tower or station to release one or two trains upon the approaches intersecting with the track upon which the moving car has the right of way. Should one of said cars carry freight and the other passengers, either one may be detained and the other permitted to pass over the crossing according as the operator may desire. As shown in Fig. 17, rails comprising crossing are spaced apart and in order that the rails at each side of the crossing may be electrically connected, wires or conductors 116 are employed.

Having thus described the invention, what is claimed as new is:

1. In a block system for railways, the combination of signal and safety appliances mounted upon the car or like part and included in independent electric circuits, signal and safety contact rails provided for each block or section of the track and adapted to control respectively the signal and safety appliances of the car when short-circuited, and means for electrically short-circuiting the signal and safety contact rails, substantially as set forth.

2. In a block system for railways, the combination of a car adapted to be mechanically propelled and provided with usual brake mechanism, a signal circuit, electric actuators for cutting off the motive power and applying the brakes and included in an electric and safety circuit, signal and safety contact rails adapted to actuate the signal and safety circuits on the car to first set the signal and subsequently apply the brakes and cut off the motive power, and means for short circuiting the signal and safety rails from a block or section.

3. In a block system for railways, the combination of a track subdivided into blocks or sections which are electrically insulated, signal and safety contact rails for each block or section of the track, means for short-circuiting said contact rails from an adjacent block when the same is occupied, signal and safety appliances provided upon a car and included in separate electric circuits, and contacts for the signal and safety circuits to bring the latter into effective operation when coming in engagement with the closed signal and safety contact rails.

4. In a block system for railways, the combination of a track subdivided into blocks or sections which are electrically insulated, contact rails for each block or section of track, a circuit closer therefor, a track circuit for each section or block including a relay and opposite rails of the block or section and adapted to control the aforesaid circuit closer to effect short-circuiting of the contact rails of a block or section immediately in the rear of an occupied block or section, and safety appliances provided upon a car and included in an electric circuit which is adapted to be brought into operation when engaging with the short-circuited contact rails.

5. In a block system for railways, the combination of safety appliances provided upon a car or like carrier and included in an electric circuit, contact rails for actuating the electric circuit of said safety appliances, a circuit closer for short-circuiting said contact rails, an electromagnet for normally holding said circuit closer open and having its terminals connected with opposite rails of a block or section of the track, and a battery having its poles electrically connected with said track rails and adapted to be short-circuited when the block is occupied by a car, whereby the electro-magnet is deënergized to permit operation of the aforesaid circuit closer to short circuit the aforementioned contact rails.

6. In a block system for railways, the combination of a signal circuit provided upon a car or like carrier, a controlling circuit for the signal circuit including brushes or contact pieces, contact rails for each block or section of track and adapted to operate the aforesaid controlling circuit to bring the signal circuit into operation, and means for short-circuiting the contact rails when a block or section of track is occupied so as to effect operation of the signal of the car entering the succeeding block or section to the one occupied.

7. In a block system for railways, the combination of safety appliances provided upon a car or like part and adapted to bring the same to a stand-still either by application of the brakes or cutting off of the motive power or both, said safety appliances being included in an electric circuit, contact rails for operating said electric circuit for bringing the safety appliances into active operation, and means for short-circuiting said contact rails near the block or section of track ahead of a following train or car to bring the latter to a stand-still, substantially in the manner specified.

8. In a car or like part, the combination of a self closing valve having connection with the train pipe to effect application of the brakes, a second self-closing valve to effect cutting off the motive power, an electric device for normally holding each valve in restraint and included in a closed circuit on the car, a controlling circuit including a switch for breaking the circuit including the said electric devices, a track circuit, contact rails for short-circuiting the said controlling circuit, and a circuit closer for bridging the circuit of the contact rails and controlled by an electro-magnet in the aforesaid controlling circuit.

9. In combination an electric block system for railways, a normally closed track circuit adapted to be short circuited by means of the moving car, or like carrier, or to be broken under abnormal conditions, safety appliances mounted upon said car, an electro-magnet normally energized and adapted to hold said safety appliances in running position and included in a closed circuit, a second electric circuit including an electro-magnet for controlling a circuit breaker in the safety appliances actuating circuit, and a controlling circuit for said second electric circuit and brought into action when the aforesaid track circuit is either short circuited or broken.

10. In a block system, the combination of a controlling valve operatively connected with the engineer's valve and with the train pipe, and having a vent, a piston or plug constituting the working element of said valve and normally closing said vent and relief of the train pipe and establishing communication between the engineer's valve and the source of motive fluid supplied thereto, an electrically controlled device normally holding the controlling valve in running position and adapted to effect release thereof under abnormal conditions, whereby the safety appliances may be automatically actuated.

11. In combination, a controlling valve mounted upon the car or like part and operatively connected with the engineer's valve and with the train pipe and having a vent and a relief, the latter being connected with the train pipe, a working piston or plug normally closing said vent and the relief oft he train pipe and establishing communication between the engineer's valve and its source of fluid motive medium supply, electric appliacnes mounted upon the train for normally holding the controlling valve in running position, and other appliances applied to the track and adapted to coöperate with the electric appliances of the train to effect automatic actuation of said valve and operation of the safety appliances.

12. In combination, a valve comprising a cylinder and a piston, said cylinder having communication with the engineer's valve and with the train pipe and provided with a vent, the piston normally closing the relief of the train pipe and the vent and normally establishing communication between the engineer's valve and its source of fluid motive medium supply, an electro-magnet normally energized and acting upon the valve to hold it in running position, a relay included in the same circuit with said electro-magnet and adapted to break said circuit under abnormal conditions and permit automatic actuation of the aforesaid controlling valve, and track means including an electric circuit for neutralizing the relay circuit of the train to effect a breaking of the circuit including the aforesaid controlling electro-magnet.

13. In a safety appliance for railway trains, and in combination with the engineer's valve, train pipe and source of supply for the brake setting medium, a cylinder having communication with the engineer's valve and the source of fluid supply therefor, a release pipe connecting the train pipe with said cylinder, the latter having a vent, a piston arranged to work in said cylinder and having a port to establish communication between the pipes leading from the engineer's valve and the source of fluid medium supply therefor and normally closing the release pipe and vent port, and automatic controlling means for said piston.

14. In a safety appliance for railway train including an engineer's valve, train pipe and source of fluid medium supply, the combination of a cylinder provided with an opening in one end and a vent near the opposite end, a piston having an opening for establishing communication between the pipes leading from the engineer's valve and source of fluid medium supply to said cylinder and normally closing the vent port and the relief pipe leading from the train pipe to said cylinder, the latter having the opening in the end opposite to the relief end of the piston for relieving the jar incident to the stoppage of the rapid movement of the piston under the action of the escape of the fluid medium from the train pipe, and operating means for said piston.

15. In combination, signal and safety appliances mounted upon a moving train, independent brushes or contacts for the signal and safety appliance circuits, safety and signal contact rails located out of line and in position to make separate connection with the respective contacts of the train, and means for connecting said safety and signal contact rails to effect automatic operation of the signal and safety appliances.

16. In combination, signal and safety appliances mounted upon the moving train and included in separate circuits, safety and signal contact rails arranged out of line and in position to make electrical connection with the brushes or contacts of the train, a track circuit having direct connection with the safety contact rails, means connecting the safety contact rails with the contact signal rails, and a relay circuit to effect closing of the track circuit and adapted to be closed by the moving train, substantially as set forth.

17. In a block system for railways, the combination of a car provided with safety appliances included in an electric circuit, contact rails for each block or section of track, a switch for short-circuiting the contact rails to effect operation of the safety appliances upon the car, a track signal, and contact rails for the track signal included in the track rails and electrically insulated from the rails of the blocks or sections of track provided with the aforementioned contact rails.

18. In combination, contact rails, contact pieces therefor, a head, and oppositely inclined pin and slot connections between said head and contact piece to admit of the latter having a limited angular movement.

19. In combination, a contact rail, a coöperating contact piece, a head, an inclined pin and slot connection between opposite end of the contact piece and head to admit of the contact piece having a limited angular movement, a support, and a yielding connection between the support and the said head to admit of a relative vertical play of said head.

20. In a railway signal, the combination of safety devices on the car or like carrier, an actuator therefor included in an electric circuit, a track circuit, a controlling circuit for the safety devices circuit actuated by the track circuit, and a signal circuit looped into the said controlling circuit and including a switch.

21. In a railway signal, the combination of safety devices on the car or like carrier, an actuator therefor included in an electric circuit, a track circuit, a controlling circuit for the safety devices circuit actuated by the track circuit, a signal circuit, and a switch in the said controlling circuit to enable the engineer or other party to determine upon trial the source of the signal when a number of track circuits have connection with a block.

In testimony whereof I affix my signature in presence of two witnesses.

DAVID S. AFFLECK. [L. S.]

Witnesses:
  V. B. HILLYARD,
  J. D. YOAKLEY.